United States Patent [19]
Tsuji et al.

[11] 3,993,840
[45] Nov. 23, 1976

[54] MOLDED PULLULAN TYPE RESINS COATED WITH THERMOSETTING RESIN FILMS

[75] Inventors: Kozo Tsuji; Nobuhiro Toyota; Fumio Fujita, all of Osaka, Japan

[73] Assignees: Sumitomo Chemical Company, Limited, Osaka; Hayashibara Biochemical Laboratories, Incorporated, both of Japan

[22] Filed: June 16, 1975

[21] Appl. No.: 587,164

[30] Foreign Application Priority Data
June 29, 1974 Japan............................. 49-74830

[52] U.S. Cl.............................. 428/413; 428/411; 428/425; 428/532
[51] Int. Cl.² ...................... B32B 9/02; B32B 9/04
[58] Field of Search ........... 428/411, 532, 413, 425; 260/209 R

[56] References Cited
UNITED STATES PATENTS

| | | | |
|---|---|---|---|
| 3,784,390 | 1/1974 | Hijiya et al. | 106/213 X |
| 3,870,537 | 3/1975 | Hijiya et al. | 260/209 R X |
| 3,888,809 | 6/1975 | Nakashio et al. | 106/213 X |
| 3,932,192 | 1/1976 | Nakashio et al. | 106/213 |

*Primary Examiner*—Harris A. Pitlick
*Attorney, Agent, or Firm*—Stevens, Davis, Miller & Mosher

[57] ABSTRACT

The surface of a molded pullulan type resin is coated with a thermosetting resin film, whereby a water-insoluble molded pullulan type resin can be obtained while retaining such excellent properties of the pullulan type resin as transparency, toughness, gas impermeability and pollution-freeness.

6 Claims, No Drawings

MOLDED PULLULAN TYPE RESINS COATED WITH THERMOSETTING RESIN FILMS

This invention relates to a molded pullulan type resin coated with a thermosetting resin film. More particularly, the invention is concerned with a water-insoluble molded pullulan type resin coated on the surface with a thermosetting resin, which has such excellent properties as transparency, toughness, gas-impermeability and pollution-freeness.

In our daily life at present, there are widely utilized such synthetic resins as polyethylene, polypropylene, polystyrene, polyvinyl chloride, polyacrylonitrile, polymethyl methacrylate, polybutadiene and polyvinyl acetate. While these resins are characteristically high in corrosion resistance, the quantities of said resins used have greatly increased in recent years, and problems concerning the abandonment thereof have come to be significant. That is, if the resins are abandoned and are left unrecovered, they remain as they are while maintaining their original shapes over long periods of time in rivers, seas, fields and mountains to not only spoil the environmental beauty but also cause various drawbacks. On the other hand, even if the resins are recovered and are subjected to combustion, some of them generate poisonous hydrochloric acid gas, like polyvinyl chloride, while the others emit intense heat, like polyethylene, polypropylene and polystyrene, to become causes for damaging the incinerators. Further, when viewed as a of starting material, the said synthetic resins are prepared from petroleum, and the problems concerning petroleum resources are also in a serious state at present.

With the above in mind, the present inventors conducted extensive studies to find that molded pullulan type resins are ideal pollution-free resins because they are transparent, tough and excellent in gas impermeability, they are prepared from starches and hence serve for the saving of petroleum resources; they are spontaneously decomposed in earth and water; and they emit no poisonous gas nor intense heat even when subjected to combustion. However, pullulan type resins have the practical disadvantage of being quite easily soluble in cold water, and hence should necessarily be made water-insoluble. With an aim to accomplish a process in which pullulan type resins can be more easily water-insolubilized, the present inventors made studies to find that a molded pullulan type resin can be easily coated with a thermosetting resin film and thus can be made resistant to water.

An object of the present invention is to provide a molded pullulan type resin coated with a thermosetting resin film.

Another object of the invention is to provide a process in which a molded pullulan type resin is made water-insoluble by coating with a thermosetting resin film while retaining such excellent properties of the molded pullulan type resin as transparency, toughness, gas-impermeability and pollution-freeness.

Other objects and advantages of the invention will become apparent from the following description.

The process of coating a molded pullulan type resin with a thermosetting resin film is not particularly limited, and there may be adopted procedures such that a molded pullulan type resin is sprayed with a solution, or a dispersion such as emulsion, suspension or plastisol, of a thermosetting resin, or is immersed in a solution or dispersion of a thermosetting resin, and is then subjected to drying and heat treatment to form a film of the thermosetting resin on the surface of said molded resin. When such a process is adopted, a part of the active point of the thermosetting resin reacts with the pullulan in the molded pullulan type resin since the pullulan has active hydrogen, with the result that a film of the thermosetting resin is firmly adhered to the surface of the molded pullulan type resin.

The molded pullulan type resin is not always required to be coated with only one layer of the thermosetting resin film, but may be coated with two or more layers thereof as occasion demands. In the latter case, a thermoplastic resin film may be used in combination with the thermosetting resin film, and may be coated according to the process employed in the case of the aforesaid thermosetting resin.

Further, in order to properly control the adhesion between the surface of the molded pullulan type resin and the thermosetting resin film, there may be used suitable amounts of usual anchor-coating agents, and/or adhesives, such as an organotitanate compound, an organoaluminum compound, a polyalkyleneimine such as polyethyleneimine, a urea resin, a melamine resin or a polyisocynate resin.

The pullulan referred to in the present invention is a linear high polymer wherein units of maltotriose, which is a trimer of glucose, have been repeatedly bonded through $\alpha$-1,6 linkages which are different from the linkages of said trimer, and has the molecular structure represented by the formula,

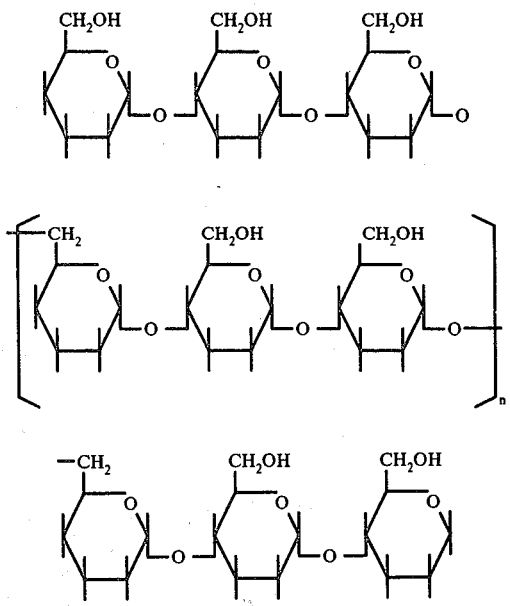

wherein $n$ is an integer of 20 to 10,000 which shows the polymerization degree.

While the pullulan used in the present invention contains glucose units in its molecule, it is entirely different in molecular structure from starch, cellulose, amylose, carboxymethyl cellulose, alkyl cellulose and the like polysaccharides or derivatives thereof which are conventional glucose derivatives composed mainly of glucose units, as in the case of pullulan. This is closely connected to the excellent properties of pullulan. Pullulan is markedly excellent in film-forming ability, and can easily form a film when its aqueous solution is flowed on a plate or the like. The thus formed film is excellent in such properties as strength, elasticity, hardness and gloss. Thus, pullulan is entirely different from the aforesaid polysaccharides or derivatives thereof which have no functionally excellent film-forming ability, or from the aforesaid amylose which cannot form a film unless troublesome procedures are adopted. Further, the pullulan film is extremely high in transparency, favorable in adhesiveness, heat resistance and weather resistance and low in gas permeability, is equal to or more excellent in properties than cellophane, which is ordinarily said to be low in gas permeability, and is more excellent in properties than nylons and polyvinylidene chlorides.

Furthermore, pullulan can be plasticized by incorporation of a polyhydric alcohol such as glycerin, ethylene glycol, polyethylene glycol, sorbitol, propylene glycol or polypropylene glycol, dimethyl sulfoxide, water or amylose, and can be easily molded by heating to a suitable temperature and applying a pressure to give films, sheets, fibers, pipes, rods or other general molded articles. These molded articles are also excellent in transparency, toughness, favorable in heat resistance and weather resistance, and low in gas permeability, like the aforesaid film, and, in addition, are easily soluble in water as mentioned previously.

In order to improve its physical properties as occasion demands, the pullulan used in the present invention may be modified by esterification, etherification, phosphatization, oxidation, sulfonation or graft-copolymerization, or may be blended with water-soluble polymers such as polyvinyl alcohol, polyethyleneimine, polyacrylamide, polyacrylic acid, polyvinyl pyrrolidone, polyethylene oxide, sodium polyacrylate, carboxymethyl cellulose, hydroxyethyl cellulose, styrene-anhydrous sodium maleate copolymer or ethylene-acrylate copolymer. In the present invention, all these modified and blended pullulans are defined as pullulan type resins.

The thermosetting resin referred to in the present invention includes polyurethanes, unsaturated polyesters and epoxy resins. Further, as the thermoplastic resin usable in forming two or more layers, there may be used a homo- or co-polymer of an olefin such as ethylene or propylene, or a vinyl compound such as styrene, acrylonitrile, vinyl acetate, vinyl chloride, vinylidene chloride, vinyl tetrafluoride, vinylidene fluoride, or acrylic or methacrylic acid or its salt or ester. Concrete examples of the thermoplastic resin are polyethylene, polypropylene, ethylene-vinyl acetate copolymer, polyvinyl acetate, polyvinyl chloride, polyvinylidene chloride, polyethylene tetrafluoride, polyvinylidene fluoride, polystyrene, polyacrylonitrile, polymethyl methacrylate, ethylene-acrylic acid copolymer, salts of said polymer, ethylene-methyl acrylate copolymer, propylene-vinyl chloride copolymer, ethylene-vinyl alcohol copolymer, polyesters such as polyethylene terephthalate, polybutylene terephthalate and polycarbonate, polyamides such as nylon, polyacetals such as polyoxymethylene, polysulfone, polyphenylene oxide, polyether sulfone and polyphenylene sulfide.

The pullulan used in the present invention is not particularly limited by the process for production thereof. At present, it can be isolated and recovered as a tacky substance secreted in a culture liquor of a strain belonging to the genus Pullularia which is an incomplete microorganism. That is, a strain of the species *Pullularia pullulans* is subjected to shaking culture at 24° C. for 5 days in a medium containing 10% of sucrose or glucose, 0.5% of $K_2HPO_4$, 0.1% of NaCl, 0.02% of $MgSO_4.7H_2O$, 0.06% of $(NH_4)_2SO_4$ and 0.04% of yeast extract, whereby pullulan is obtained as a tacky substance secreted from the cells into the culture liquor. If necessary, purified pullulan may be obtained by removing the cells from the culture liquor by centrifugation, and subjecting the supernatant to methanol precipitation and separation.

Pullulan somewhat varies in physical properties depending on the kind of strain used. In the present invention, however, pullulan obtained from any strain may be used without particularly affecting the properties of the resulting molded article.

The molecular weight of the pullulan used in the present invention is not particularly limited, but is 10,000 to 5,000,000 preferably 70,000 to 2,000,000.

The molded pullulan type resin coated with a thermosetting resin film which is obtained according to the present invention is high in water resistance by virtue of the characteristic properties of the thermosetting resin. In case the thermosetting resin film used is transparent, the molded resin coated therewith is also excellent in transparency. Further, the molded pullulan type resin thus coated is slightly higher in mechanical strength than the molded pullulan type resin itself.

When coated according to the process of the present invention, a pullulan film becomes a film that is high in water resistance and low in gas permeability and hence is preferable as a packing material which is required to be high in water resistance and gas impermeability. In the case of a general molded article also, the properties of both pullulan and thermosetting resin are successfully displayed such that at the time of use, the molded article is water resistant, while at the time of combustion, it generates less amounts of heat by virtue of the characteristic properties of pullulan, with the result that the incinerator can be prevented from damage. Even when abandoned in the natural world, the said molded article becomes quite easily decomposable by microorganisms in water or earth, when the thermosetting resin film is marred or peeled and thus the molded pullulan type resin is exposed.

As is clear from the above, the molded pullulan type resin of the present invention can be said to be a pollution-free molded article.

The present invention is illustrated in more detail below with reference to examples, but the examples are illustrative and do not limit the scope of the invention.

EXAMPLE 1

0.8 Part of a film (50 mm × 50 mm × 50 μ), which had been prepared by casting on a glass plate an aqueous solution containing 25 wt% of pullulan (molecular weight 150,000), was dipped for 5 seconds in a mixed liquid comprising 100 parts of Desmophene 651 (branched polyester, OH% = 8%; produced by Sumitomo-Bayer Urethane Co.) and 120 parts of Desmodur N (polyfunctional aliphatic isocyanate, NCO content = 16 – 17%, density 1.06 g/cm$^3$, Viscosity at 20° C=250 cps; produced by Sumitomo-Bayer Urethane Co.). Thereafter, the film was taken up and heat-treated at 80° C. for 24 hours. As the result, the pullulan film was coated with 0.2 part of a polyurethane composed of said Desmophene 651 and Desmodur N. Physical properties of the pullulan film coated with said polyurethane were as shown in Table 1.

Table 1

|  | Thickness ($\mu$) | Water solubility | Transparency | Tensile strength (kg/cm$^2$) | Tensile modulus (kg/cm$^2$) | Oxygen permeability (cc/m$^2$ . 24 hr. atm.) |
| --- | --- | --- | --- | --- | --- | --- |
| Pullulan film | 50 | Soluble | Favorable | 420 | 13900 | 2.1 |
| Pullulan film coated with polyurethane | 70 | Insoluble | Favorable | 600 | 14300 | 2.0 |

As is clear from Table 1, the pullulan film could be water-insolubilized while retaining characteristic properties inherent to pullulan.

EXAMPLE 2

A pullulan powder (molecular weight 150,000) containing 15% of water was press-molded for 10 minutes at 100° C. under 150 kg/cm$^2$ to prepare a test piece of 5 cm × 5 cm × 0.2 cm. This test piece was dipped for 5 seconds in a mixed liquid comprising 100 parts of Sumiepoxy ELA-115 CA (Polycondensation product of epichlorhydrin and bisphenol A, Density=1.14, viscosity at 25° C=700 – 1100 cps, epoxy equivalent=180 – 194; produced by Sumitomo Chemical Co.) and 20 parts of Sumicure HA (aliphatic amine, amine equivalent 37; produced by Sumitomo Chemical Co.). Thereafter, the test piece was taken up and heat-treated at 100° C. for 4 hours. As the result, the molded pullulan could be uniformly coated with the above-mentioned epoxy resin. The molded pullulan coated with the epoxy resin was transparent and tough and showed no change even when immersed in water for 24 hours.

EXAMPLE 3

0.8 Part of a film (50 mm × 50 mm × 50 $\mu$), which had been prepared by casting on a glass plate an aqueous solution containing 25 wt% of pullulan (molecular weight 150,000), was dipped for 5 seconds in a mixed liquid comprising 2.5 parts of diallyl phthalate, 10 parts of acetone and 0.005 part of benzoyl peroxide. Thereafter, the film was taken up and heat-treated at 60° C. for 2 hours. As the result, the pullulan film could be uniformly coated with a layer of the diallyl phthalate. The pullulan film thus coated was transparent and tough and was insoluble in water. This film was ground into fine pieces and then immersed in water, whereby the pullulan portion was dissolved and only pieces of crosslinked diallyl phthalate film of about 10 $\mu$ in thickness remained.

EXAMPLE 4

A polyethylene film Sumikasen L-705 (Melt index=7 g/10 min.; Density=0.919; produced by Sumitomo Chemical Co.) was subjected for 5 seconds to corona treatment using an electric power of 1 KW to make the surface tension of the film 40 dyne/cm. The thus treated film was press-adhered at 150° C. under 10 kg/cm$^2$ for 1 minute to the polyurethane-coated pullulan film obtained in Example 1. Physical properties of the resulting film were as set forth in Table 2.

Table 2

| Thickness ($\mu$) | Water solubility | Transparency | Tensile strength (kg/cm$^2$) | Tensile modulus (kg/cm$^2$) | Oxygen permeability (cc/m$^2$ . 24 hr. atm.) |
| --- | --- | --- | --- | --- | --- |
| 100 * | Insoluble | Favorable | 510 | 11300 | 2.0 |

* Polyethylene layer is 30 $\mu$ and Pullulan layer coated with polyurethane is 70 $\mu$.

What is claimed is:

1. A molded pullulan type resin coated with a thermosetting resin film selected from the group consisting of polyurethane and epoxy resin.

2. A molded resin according to claim 1, wherein the thermosetting resin film is further coated with a thermoplastic resin.

3. A molded resin according to claim 2, wherein the thermoplastic resin is one member selected from the group consisting of polyethylene, polypropylene, ethylene-vinyl acetate copolymer, polyvinyl acetate, polyvinyl chloride, polyvinylidene chloride, polyethylene tetrafluoride, polyvinylidene fluoride, polystyrene, polyacrylonitrile, polymethyl methacrylate, ethylene-propylene copolymer, ethylene-acrylic acid copolymer, salts of said polymer, ethylene-methyl acrylate copolymer, propylene-vinyl chloride copolymer, ethylene-vinyl alcohol copolymer, polyethylene terephthalate, polybutylene terephthalate, polycarbonate, nylon, polyoxymethylene, polysulfone, polyphenylene oxide, polyether sulfone and polyphenylene sulfide.

4. A molded resin according to claim 1, wherein the molecular weight of the pullulan type resin is 10,000 to 5,000,000.

5. A molded resin according to claim 1 in the form of a film, sheet, fiber, pipe or rod.

6. A molded resin according to claim 1, wherein an anchor-coating agent, or an adhesive is interposed between the surface of the molded pullulan type resin and the thermosetting resin film.

* * * * *